Oct. 8, 1935.　　　　L. DE HYMEL　　　　2,016,596
GRATER
Filed June 11, 1934
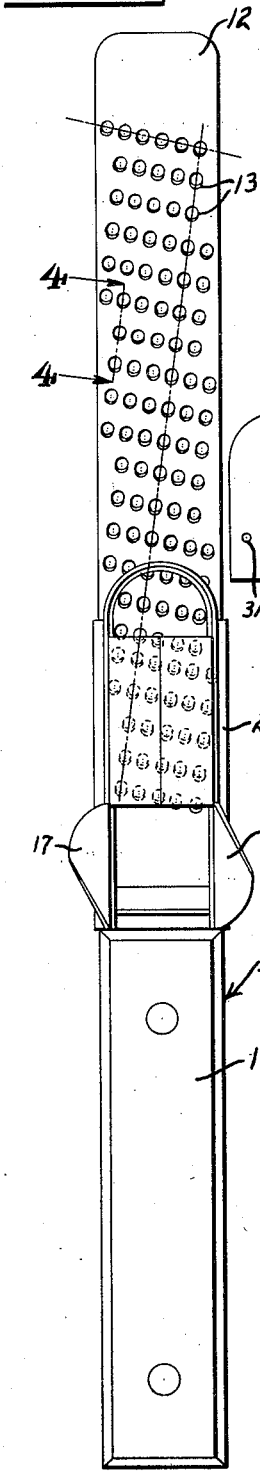
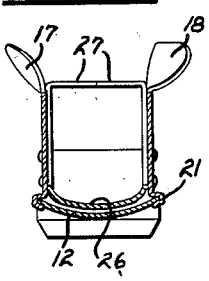
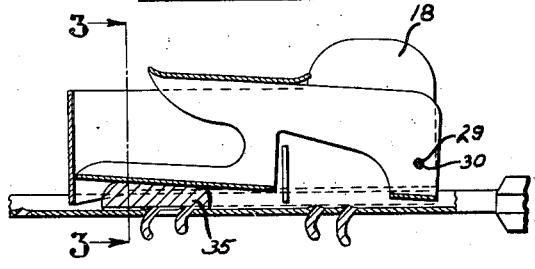
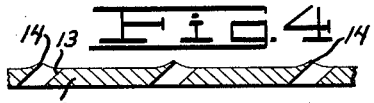
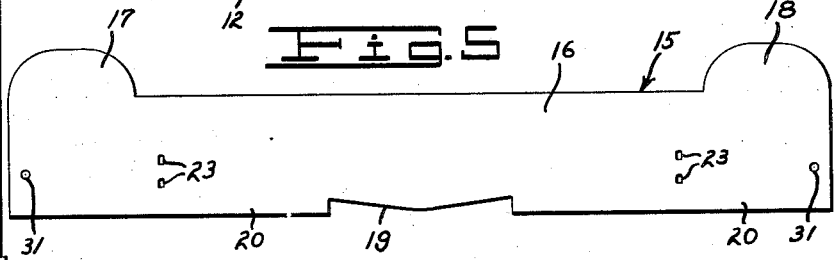
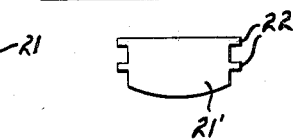
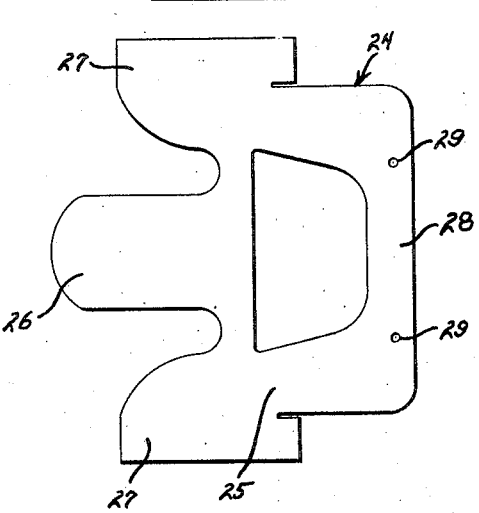
INVENTOR.
Leo DeHymel
BY
ATTORNEY.

Patented Oct. 8, 1935

2,016,596

UNITED STATES PATENT OFFICE 2,016,596

GRATER

Leo De Hymel, Pasadena, Calif.

Application June 11, 1934, Serial No. 729,954

8 Claims. (Cl. 146—179)

This invention relates to graters.

The general object of this invention is to provide an improved grater which is particularly adapted for shredding vegetables such as garlic, carrots, pimentos, etc.

A more specific object of my invention is to provide an improved garlic spoon which can be economically manufactured and which can be operated without the operator touching the garlic.

Other objects and the advantages of this invention will be apparent from the following description taken in connection with the following drawing wherein:

Fig. 1 is a top plan view of a garlic spoon embodying the features of my invention;

Fig. 2 is a central sectional view showing my garlic spoon;

Fig. 3 is a section taken on line 3—3 of Fig. 2;

Fig. 4 is a fragmentary section taken on line 4—4 of Fig. 1;

Fig. 5 is a plan view showing the blank from which the base member is formed;

Fig. 6 is a view similar to Fig. 5 showing the blank from which the clamping member is formed;

Fig. 7 is a plane view showing the partition.

Referring to the drawing by reference characters, I have shown my invention as embodied in a garlic spoon indicated generally at 10. As shown this spoon comprises a handle portion 11 from which a blade 12 projects. This blade is preferably arcuate in cross section and is provided with a plurality of rows of perforations 13. The rows of perforations 13 extend diagonally across the blade and the perforations are also in a straight line in slight diagonal arrangement relative to the longitudinal axis of the blade 12.

Each of the perforations 13 as shown in Fig. 4 includes a forward sharpened cutting edge 14 and the arrangement of the cutting edges is such that as an article is moved outwardly on the blade the material is cut by the edges 14 and is extruded through the perforations 13. The diagonal arrangement of apertures insures constant cutting.

In order to hold an article on the blade or spoon I provide a base member indicated generally at 15. This base member includes a body portion 16 having end wings 17 and 18 thereon and having a notch 19. The body member is bent in substantial U-shape as shown in Fig. 1 and the lower edge 20 thereof at each side of the notch 19 is bent into U-shape as shown at 21, to loosely and slidably engage the blade 12. The wings 17 and 18 are bent outwardly as shown in Figs. 1 and 3 to form gripping portions by which the operator may move the base member.

A partition 21' extends across the base member and this partition has tongues 22 thereon which fit apertures 23 in the base member to hold the partition in place. The partition prevents the holder from engaging the cutting edges 14.

Pivotally mounted on the base member I show a clamping member indicated generally at 24. This clamping member includes a body portion 25 having a tongue 26 thereon which is bent into arcuate shape as shown in Fig. 3 and the body is also provided with end portions 27 which are folded over as shown at Fig. 3 to form a top part and the body is also provided with a rear portion 28 which is bent into U-shape and which is provided with apertures 29 which in the finished form are in alignment and through which a pin 30 passes. The pin 30 also passes through apertures 31 in the base member to hold the parts in assembled relation.

The blank shown in Figs. 5, 6 and 7 is formed up and assembled as described and the holder is placed on the knife, or what I prefer to term the spoon, and a clove of garlic or other article indicated at 35 is placed in the base member and the clamping member is moved down into engaging position.

The base member is then moved back and forth across the knife and each outward movement thereof causes the cutting edges 14 of the perforations 13 to remove some of the garlic clove and forces it into or through the perforations 13. After enough garlic has been grated or shredded the spoon is withdrawn and it is stirred through the material be it soup, salad or whatever is being prepared so that the garlic will pass into the material thus flavoring the same. During all of these operations the operator's hands do not come in contact with the garlic clove and no odor remains on the hands after using my grater.

From the foregoing it will be apparent that I have invented a novel form of garlic spoon which can be economically manufactured and which is highly efficient in use.

Having thus described my invention, I claim:

1. In a garlic spoon, a blade, said blade being arcuate in cross section and having perforations therein, a garlic holder comprising a base member slidably mounted on said blade, said base member including spaced upstanding side walls, a transverse partition joined to said side walls and a clamping member pivoted to said base member and including a garlic engaging portion, said garlic engaging portion being arcuate in cross-section and similar in curvature to that of the blade.

2. In a garlic spoon, a blade, said blade being arcuate in cross section and having perforations therein, a garlic holder comprising a base member slidably mounted on said blade, said base member including spaced upstanding side walls, a clamping member pivoted to said base member and including a garlic engaging portion, a partition at the end of the garlic engaging portion and a portion beyond the partition and spaced from said garlic engaging portion, said spaced portion having a finger grip therein.

3. In a garlic spoon, a blade, said blade being arcuate in cross section and having perforations therein, a garlic holder comprising a base member slidably mounted on said blade, said base member including spaced upstanding side walls, a partition joining said side walls, a clamping member pivoted to said base member and including an arcuate garlic engaging portion the one side of the partition and a portion at the other side of the partition and spaced from said garlic engaging portion, said spaced portion having a finger grip therein, said base member having a wing thereon.

4. In a garlic spoon, a blade having a handle thereon, said blade being arcuate in cross section and having a plurality of rows of diagonally arranged perforations therein, a garlic holder comprising a base member having grooves at each side thereof and slidably mounted on said blade, said base member including a front wall and a pair of spaced side walls, a partition joining said side walls, and a clamping member in advance of said partitions and pivoted to said base member and including an arcuate garlic engaging portion.

5. In a garlic spoon, a blade having a handle thereon, said blade being arcuate in cross section and having a plurality of rows of diagonally arranged perforations therein, a garlic holder comprising a base member having grooves at each side thereof and slidably mounted on said blade, said base member including a front wall and a pair of spaced side walls, a partition joined to said side walls and a clamping member in advance of said partition and pivoted to said base member and including an arcuate garlic engaging portion and an upper portion spaced from said garlic engaging portion, said upper portion having a finger grip therein and said base member having a pair of outwardly flared wings thereon.

6. In a garlic spoon, a blade and a garlic holder, said blade including a handle member at one end and a transversely cupped blade at the other end, said blade having cutting perforations therein, said garlic holder including a base member having an arcuate end and a pair of side walls, said side walls having outstanding wings thereon and the lower edges of said base member being bent to form grooves slidably engaging said blade, a partition extending across said base member intermediate the length thereof and secured thereto and a garlic engaging member, said garlic engaging member having an arcuate tongue corresponding in curvature to the curvature of said blade, said tongue including a top portion, the rear portion of said garlic engaging member having apertures therein, the rear walls of said base member having aligned apertures and a pintle pin passing through the apertures in the base member and the garlic engaging member.

7. In a garlic spoon, a blade and a garlic holder, said blade including a handle member at one end and a transversely cupped blade at the other end, said blade having cutting perforations therein, said garlic holder including a base member bent to form an arcuate end and a pair of side walls, said side walls having outstanding wings thereon and the lower edges of said base member being bent to form grooves slidably engaging said blade, a partition extending across said base member intermediate the length thereof and secured thereto and a garlic engaging member, said garlic engaging member being bent to form an arcuate tongue corresponding in curvature to the curvature of said blade, said tongue being connected to a top portion by side members, said garlic engaging portion including a recess receiving said partition, the rear portion of said garlic engaging member being bent to U-shape and each leg of the U having an aperture therein, the rear walls of said base member having aligned apertures and a pintle pin passing through the apertures in the base member and the garlic engaging member.

8. In a garlic spoon, a blade and a garlic holder, said blade including a handle member at one end and a transversely cupped blade at the other end, said blade having perforations therein with a cutting edge on the blade adjacent each perforation, said garlic holder including a base member made out of a single piece of metal bent to form an arcuate end and a pair of side walls, said side walls having outstanding wings thereon and the lower edges of said base member being bent to form grooves slidably engaging said blade, a partition extending across said base member intermediate the length thereof and secured thereto and a garlic engaging member, said garlic engaging member being made of a single piece of metal bent to form an arcuate tongue corresponding in curvature to the curvature of said blade, said tongue being connected to a top portion by side members, said garlic engaging portion including a recess receiving said partition, the rear portion of said garlic engaging member being bent to U-shape, each having an aperture therein, the rear of said base members having aligned apertures and a pintle pin passing through the apertures in the base members and the garlic engaging member.

LEO DE HYMEL.